United States Patent Office 2,950,976
Patented Aug. 30, 1960

2,950,976

METHOD OF PRESERVING A PERISHABLE PRODUCT

Gabriel Fadlallah Kher, Badaro St., Raad Bldg., Beirut, Lebanon

No Drawing. Filed May 17, 1957, Ser. No. 659,763

Claims priority, application Lebanon May 21, 1956

4 Claims. (Cl. 99—166)

The present invention relates to a method of preserving perishable produce, compositions for preserving the same and produce when treated for such preservation.

It is known to coat apples and pears with paraffin wax so that they are preserved for a prolonged time in their state of freshness, without appreciable alteration in appearance, smell or taste.

This treatment is both delicate to perform and expensive, and moreover is not particularly suitable for the protection of citrous fruits, tomatoes or other juicy fruits or vegetables which are especially sensitive to organisms producing mould.

It is, therefore, one object of the present invention to provide a treatment for protecting fruit and vegetables with juicy skins as well as other perishable produce. It relates to methods of preserving perishable produce such as fruit, vegetables or eggs by protecting them against organisms producing mould and against other causes of natural decay, and to compositions for preserving such produce and to the said produce when treated for such preservation.

It is another object of the present invention to provide a perishable product, such as a fruit, a vegetable or an egg, which is treated so as to protect it against organisms producing mould and against other causes of natural decay.

Thus, according to the present invention there is provided a perishable product chosen from the group consisting of a fruit, a vegetable and an egg, coated with a solution of rosin and gum lac in an alcohol, thereby to protect it against organisms producing mould and against other causes of natural decay.

It is a further object of the present invention to provide a method of preparing such coated and/or superficially impregnated perishable product, such method comprising treating the said perishable product with a solution of rosin and gum lac in an alcohol.

Any suitable alcohol, whether consumable or not, may be used.

Advantageously the rosin and gum lac are technical commercial products.

The proportions of rosin and gum lac can be varied considerably; however a proportion of three parts rosin to one part gum lac, by weight, is particularly suitable. A total percentage of rosin and gum lac of from 5 to 15% by weight is generally enough.

According to a further feature of the invention, glycerine may also be added to the solution in order to make the protective skin plastic and to prevent it from flaking. The proportion of glycerine will generally be small, in practice not exceeding 1% by weight. Thus it is preferable to provide a solution of an alcohol containing from 5 to 10% by weight of rosin, from 1 to 4% by weight of gum lac and glycerine in a proportion not exceeding 1% by weight.

The following solution has given however, very good results when used for the treatment of citrous fruit:

| | Percent by weight |
|---|---|
| Rosin | 7.5 |
| Gum lac | 2.5 |
| Glycerine | 0.1 |
| Alcohol | Remainder |

It has been found that the coating and/or superficial impregnation of produce with this solution does not give rise to any particular difficulty and is performed by the usual techniques of spraying, steeping or mixing, in appropriate installations.

A product so treated becomes coated with a skin which protects it from organisms producing mould, and such skin ensures conservation of the state of freshness of the product without alteration in appearance, smell or taste in the usual climatic conditions of cold, temperate or subtropical countries, even up to a maximum temperature of the order of 35° C.

The same solution can be used for the treatment of fruit other than citrous fruit, as well as for the treatment of vegetables. Excellent results have also been obtained for the preservation of eggs by simply coating each of them with a fine skin of this solution.

While I have disclosed one embodiment of the present invention, it is to be understood that this embodiment is given by example only and not in a limiting sense, the scope of the present invention being determined by the objects and the claims.

I claim:

1. A method of preparing a protective imperfectly airtight film on a perishable product chosen from the group consisting of a fruit, a vegetable and an egg, comprising the step of treating said perishable product with a solution of an alcohol containing from 5 to 10% by weight of rosin, and from 1 to 4% by weight of gum lac.

2. The method, as set forth in claim 1, wherein said solution contains a total of from 5 to 15% by weight of said rosin and said gum lac.

3. The method, as set forth in claim 1, wherein said rosin is present in a proportion which is three times greater by weight than that of said gum lac.

4. A method of preparing a protective imperfectly airtight film on a perishable product chosen from the group consisting of a fruit, a vegetable and an egg, comprising the step of treating said perishable product with a solution of an alcohol containing from 5 to 10% by weight of rosin, from 1 to 4% by weight of gum lac and glycerine in a proportion not exceeding 1% by weight.

References Cited in the file of this patent

UNITED STATES PATENTS

| 7,256 | Billings | Apr. 9, 1850 |
| 42,396 | Perkins | Apr. 19, 1864 |
| 388,879 | Jensen | Sept. 4, 1888 |
| 784,503 | Rucker et al. | Mar. 7, 1905 |
| 1,246,392 | Carrasco | Nov. 13, 1917 |

OTHER REFERENCES

"The Condensed Chemical Dictionary," Fifth Edition, 1956, by A. Rose et al., published by Reinhold Publishing Corp., New York, page 338, article entitled "Dammar," and page 949, article entitled "Rosin."